July 2, 1968  J. A. DETRIO  3,391,279
LASER TOTAL ENERGY DETECTOR
Original Filed Aug. 4, 1964

*INVENTOR.*
JOHN A. DETRIO
BY: *Harry M. Saragovitz,*
*Edward J. Kelly,*
*Herbert Berl &* ATTORNEYS:
*S. Pubroff*

United States Patent Office 3,391,279
Patented July 2, 1968

3,391,279
LASER TOTAL ENERGY DETECTOR
John A. Detrio, Rockaway, N.J., assignor to the United States of America as represented by the Secretary of the Army
Continuation of application Ser. No. 387,533, Aug. 4, 1964. This application Nov. 28, 1967, Ser. No. 686,348
3 Claims. (Cl. 250—83.3)

ABSTRACT OF THE DISCLOSURE

A pulsed radiation detector capable of measuring laser pulse energies comprising a pair of conically-shaped aluminum foil receivers disposed in a thermally and electrically insulating block having temperature sensing means differentially attached to said receivers for measuring energy output emitted by the laser.

---

This application is a continuation of Ser. No. 387,533 filed Aug. 4, 1964.

The invention described herein may be manufactured and used by or for the Government for governmental purposes without the payment to me of any royalty thereon.

This invention relates to the detection of stimulated emission of radiations and more particularly concerns an inexpensive yet highly sensitive device for detecting the energies emitted by laser type devices.

Light given out by an optical ruby maser, for example, is nominally emitted as a nearly parallel, monochromatic, coherent beam. In addition, pulsed laser operation can occur over very short periods of time, on the order of 100 microseconds in duration, and be composed of many pulses of high peak power. The frequency of these pulses and the wide variation in peak powers encountered place restrictions on the detectors used to measure the total energy output.

Detectors which depend on the heating effect of the laser radiation eliminate these stringent linearity, response time and saturation requirements.

It is therefore an object of the present invention to provide a device for detecting radiation emitted by laser devices.

Another object of the invention is to provide a device which is inexpensive yet highly sensitive.

The exact nature of this invention as well as other objects and advantages thereof will be readily apparent from consideration of the following specification relating to the annexed drawing in which.

Figure 2:
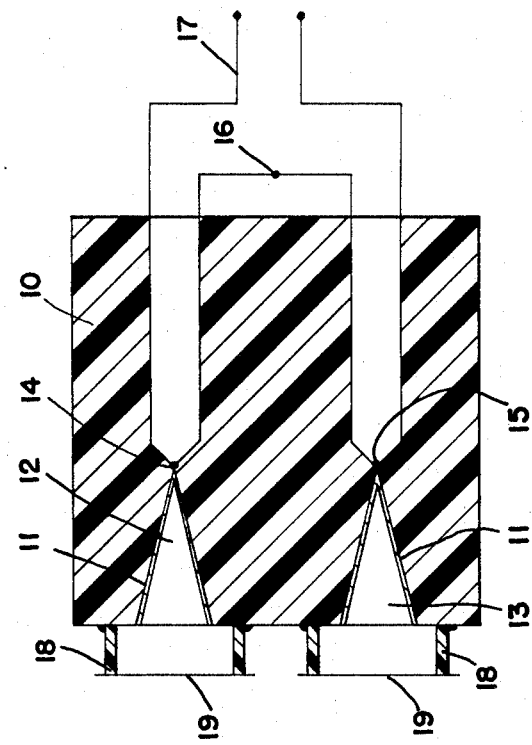
FIG. 2 shows a section of the device of FIG. 1 taken on line 2—2 thereof.
Figure 1:
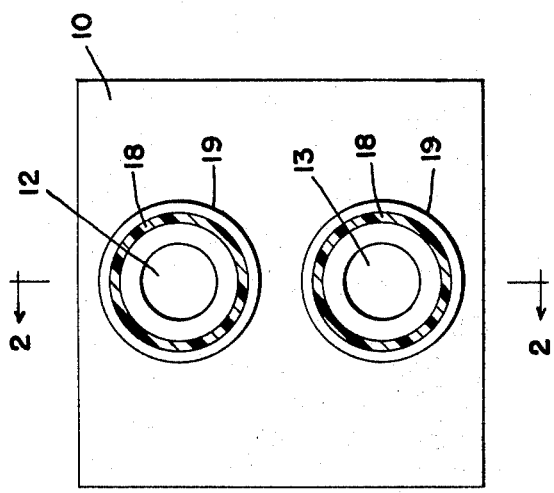
FIG. 1 is a front view of the device embodying my invention.

Referring now to the drawings, the numeral 10 designates a block of foamed plastic, suitably Styrofoam, a bubble-type polystyrene product of Dow Chemical Co., which is similarly recessed at 11—11 by the insertion therein of a pointed instrument such as a suitable tapered ream.

Into each recess will ultimately be placed a cone of aluminum foil or the like made by wrapping the foil around a tapered dowel such as a pencil point. At the tails of each one are crimped a thermal sensing element 14–15 which in the embodiment illustrated, are iron-constantan thermocouples. The thermocouples may be additionally secured to the cone tails by a drop of proxylin-base cement such as "Duco" cement, a product of E. I. du Point de Nemours & Co. The thermocouple wires are easily pushed through the plastic 10 such that the cones 12 and 13 are seated in their respective recesses as shown.

The thermocouples are connected in a differential manner to each other such that their positive (or negative) wires are connected as at 16 and their remaining wires connected to a potentiometer or microvoltmeter at 17 or to a recording voltmeter.

A windshield assembly comprising plastic tubing 18, suitably polyethylene, with a transmitting window 19 of glass, preferably a microscope slide cover having a thickness of about 0.001 inch adhesively secured thereto, prevents or minimizes effects of air circulation within the cones. The entire windshield assembly is then cemented to the block 10.

In the practice of my invention, one of the cones will function as a reference point to indicate ambient conditions while the other is similarly subjected to the same ambient conditions as well as to the radiations emitted by the laser.

The emitted radiation is transmitted into cone 12 through window 19 thus heating the junction of thermocouple 14 to produce a voltage. This voltage will be greater than the voltage produced by cooler thermocouple 15 and since the couples are connected to oppose each other, the two voltage or signals will be added algebraically, thus elimininating ambient noise and improving stability of the system. The resultant voltage will be indicated at the output 17 which may be calibrated to indicate the energy emitted by laser devices.

A specific example of the sensitivity of my device follows: The signal from the detector was fed into a Keathly Model 150A recording voltmeter and the reading preserved on a Varian potentiometer chart recorder. The detector indicated a peak output of 68 microvolts compared with 7.0 microvolts from one typical commercially available device employing similar principles of operation when illuminated by a Maser Optics Model 600 laser pulsed at 200 joules electrical input. Reference conditions were approximately 22° centigrade for both devices.

From the foregoing description, it is apparent that I have provided an extremely inexpensive yet highly sensitive device for detecting energy outputs of lasser type devices.

I claim:

1. A detector for measuring pulsed coherent optical radiation from a laser-maser type device, said pulses being of the order of about 100 microseconds duration, said detector comprising an electrically and thermally insulating non-metallic block,
   a pair of non-metallic radiation receivers disposed in said block,
   thermal sensing means contacting each of said receivers and connected in differential manner, and
   shielding means for protecting said receivers from effects of air convection.

2. The detector as described in claim 1 wherein said sensing means comprises a thermocouple attached to each of said receivers.

3. The detector as described in claim 2 wherein said thermocouple is iron-constantan.

References Cited

UNITED STATES PATENTS

| | | | |
|---|---|---|---|
| 3,091,693 | 5/1963 | Rudomanski | 250—83.3 |
| 3,131,304 | 4/1964 | Hager | 250—83.3 |
| 3,222,522 | 12/1965 | Birkebak | 250—83.3 |

RALPH G. NILSON, *Primary Examiner.*

A. B. CROFT, *Assistant Examiner.*